Jan. 19, 1932.  W. O. NELSON ET AL  1,841,906
WEEDING MACHINE
Filed April 8, 1930   3 Sheets-Sheet 1
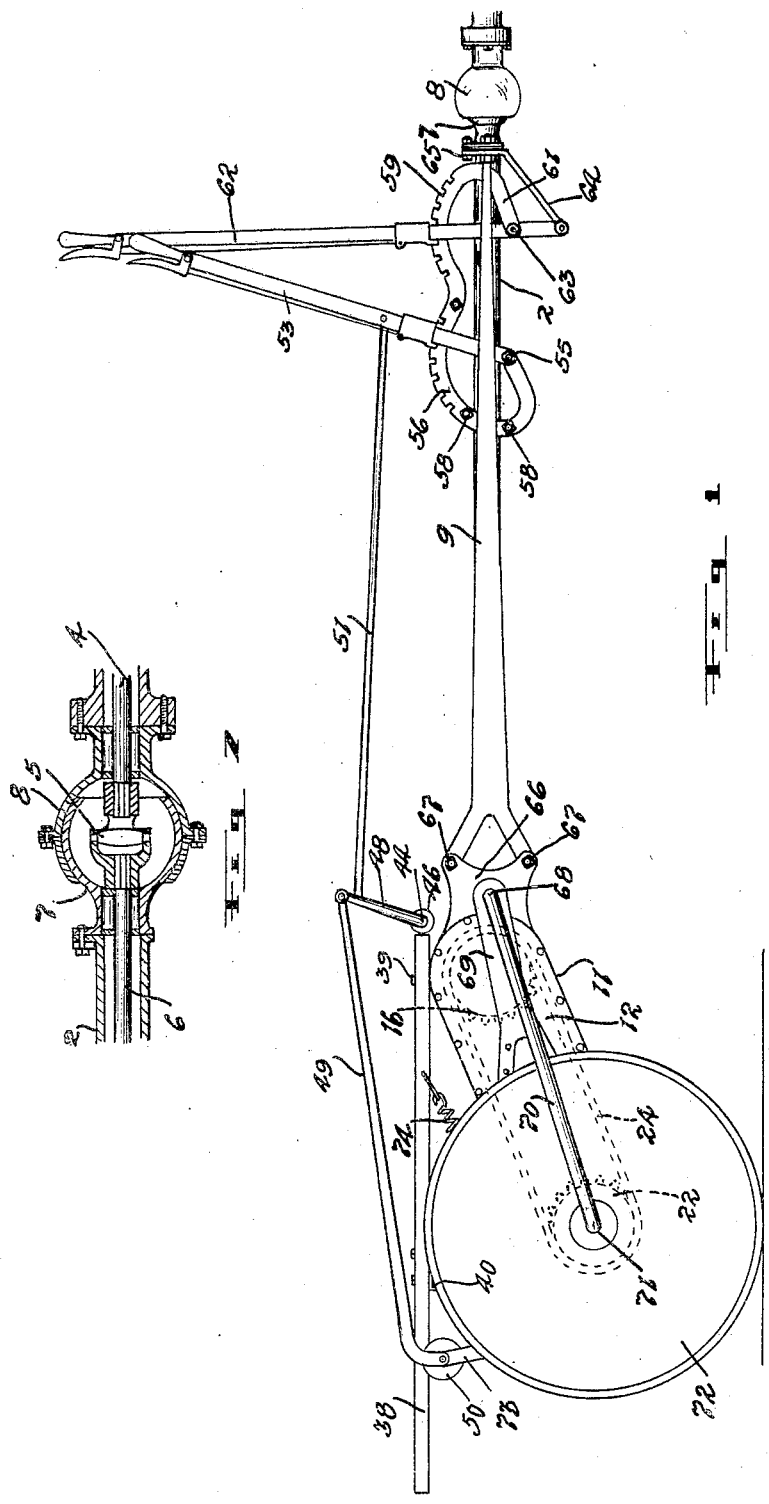
Inventors
W. O. Nelson
S. O. Brune

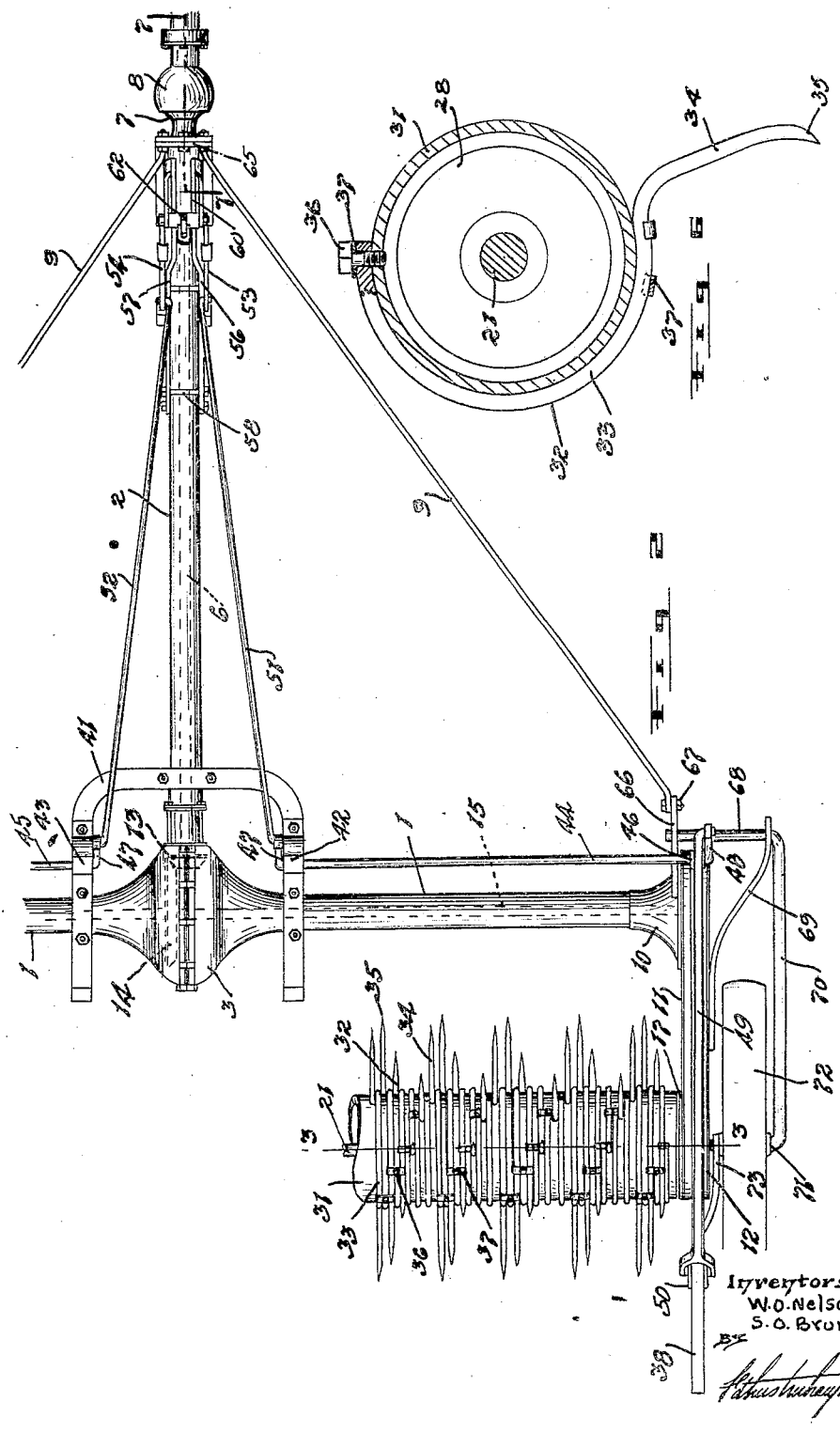

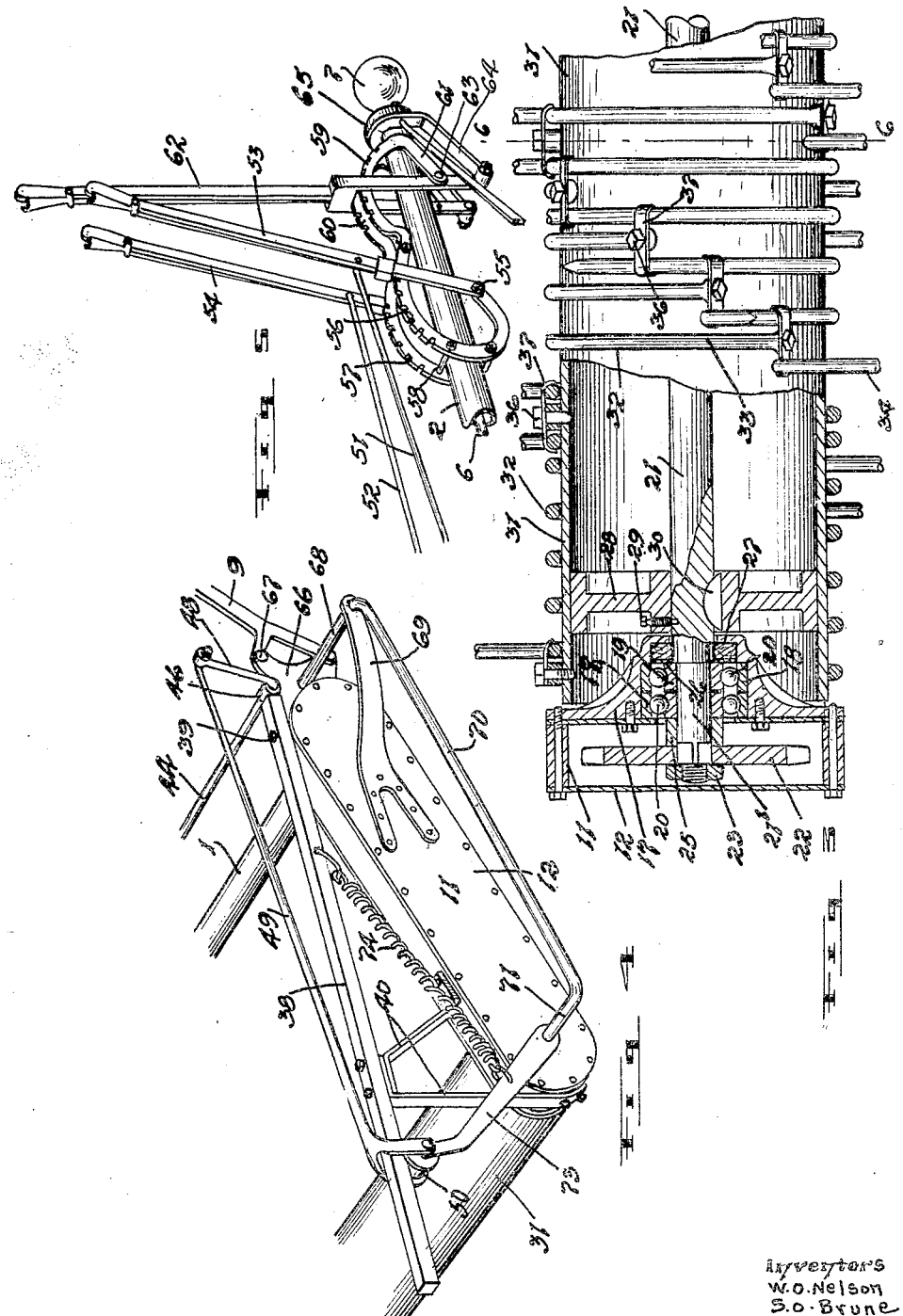

Patented Jan. 19, 1932

1,841,906

UNITED STATES PATENT OFFICE

WALTER O. NELSON, OF OSLO, MINNESOTA, AND SIVERT O. BRUNE, OF WINNIPEG, MANITOBA, CANADA

WEEDING MACHINE

Application filed April 8, 1930. Serial No. 442,605.

The invention relates to improvements in weeding machines and particularly to a weeding machine of the rotary type and an object of the invention is to construct a rotary weeding machine designed for use with a tractor having what is known as a rear power take-off, the weeder being drawn by the tractor and driven by the power take-off and operating to uproot the obnoxious weeds in the field and leave them lying on the ground surface exposed to the weather and sun.

A further object is to construct the weeder so that it can swing freely, under working conditions, in regard to the tractor thereby permitting the ready turning of the tractor and the weeder on the field.

A further object is to construct the machine so that the rotary cylindrical drum may be driven at varying speeds and adjusted as desired in respect to the ground surface to vary the depth at which the drum tines or prongs penetrate the ground, and also to construct the tines so that they will effectively work the ground hurling the roots upwardly into the air and so that they can be easily and quickly attached to the drum and will not be easily broken should they come in contact with hard or solid obstacles in the ground.

A further object is to arrange the tines or prongs in relation to one another so that they will not dig large chunks of sod, such insuring of the effective eradication of the weeds from the soil.

A further object is to construct the weeder so that the controlling levers are located at the front end thereof adjacent the tractor whereby they are within convenient range of the tractor attendant.

A further object is to construct the device so that all the various working parts are guarded against dust and dirt and are effectively lubricated.

A further object is to support the machine frame by land wheels which can be independently adjusted by separate levers provided or simultaneously adjusted by a main lever, the levers being all located at the front end of the frame.

A further object is to provide a relatively light, yet amply reinforced frame, and to arrange the various parts so that they can be readily assembled or dismounted for repair or other purposes.

With the above more important and other minor objects in view which will become more apparent as the description proceeds, the invention consists essentially in the arrangement and construction of parts hereinafter more particularly described, reference being had to the accompanying drawings, in which:—

Fig. 1 is a side view of the machine.

Fig. 2 is a plan view of a portion of the machine.

Fig. 3 is an enlarged detailed vertical sectional view at 3—3 Figure 2.

Fig. 4 is a perspective view of a portion of the machine.

Fig. 5 is a perspective view of the control levers and associated parts.

Fig. 6 is an enlarged detailed vertical cross sectional view at 6—6 Figure 3.

Fig. 7 is an enlarged detailed vertical sectional view at 7—7 Figure 2.

In the drawings like characters of reference indicate corresponding parts in the several figures.

The main frame of the machine embodies the main shaft housing 1 and the drive shaft housing 2, the rear end of the drive shaft housing being connected to the gear casing 3 located centrally of the main shaft housing. The front end of the drive shaft housing is designed for connection to a tractor of the type having what is known as a rear power take-off, and the connection is in the form of a ball and socket joint which contains a universal joint, the ball and socket joint permitting the weeding machine to swing freely in regard to the tractor and the universal joint accommodating the driving of the weeder by the tractor in all the various positions it may take.

We have not considered it necessary to show or describe in detail the tractor as such is well known. We have indicated however at 4 the power take-off shaft of the tractor and the rear end of the shaft 4 drives through the conventional type of universal joint 5 the drive shaft 6 of our machine which passes rearwardly through the housing 2, being suitably carried in the customary bearings provided.

The universal joint 5 is housed within the ball 7 located at the forward end of the housing 2 and the ball is swivelly received in the usual manner within the socket 8, attached to the tractor and through which the power take-off shaft 4 enters to be connected through the universal joint 5 with the drive shaft 6, the universal joint being centered within the ball. According to this arrangement it will be observed that the weeder can swing free at all times in respect to the tractor, thereby permitting of easy and free turning and while being driven by the power take-off shaft of the tractor.

The front end of the housing 2 is connected by radius rods 9 to the ends of the housing 1, the special connection being later described in detail. The ends of the housing 1 terminate in similar flaring heads 10, to which we permanently secure the forward elevated ends of elongated, rearwardly and downwardly inclined opposing gear casings 11. In this connection we might explain that while only one side of the machine is shown in Figure 2, the other side thereof is identical in construction. The outer sides of the gear casings are closed by removable cover plates 12, these plates permitting of the inspection or removal of the interior parts when desired and it is desired that these gear casings be oil tight so that oil for lubricating purposes can be placed therein.

The drive shaft 6 has its rear end terminating in a bevel pinion 13 which meshes with a bevel gear 14 secured to the main shaft 15, the latter shaft being carried in suitable bearings contained within the housing 1. The ends of the shaft 15 terminate within the gear casings 11 and are therein provided with similar chain wheels or sprockets 16 utilized to drive the cylindrical drum later described.

The rear lower ends of the gear casings 11 are provided at the inner sides with similar horizontally opposing bearing casings 17 permanently fastened thereto, and which contain ball raceways 18 and cones 19, between which latter are interposed ball bearings 20. The cones of the casings 17 receive rotatably the contracted spindle like ends 21' of the drum shaft 21, and the ends of the drum shaft are squared to receive each a chain wheel or sprocket 22, the sprocket being retained by a nut 23. The sprockets or chain wheels 22 and 16 in each casing 11 are connected by a driving chain 24, so that the drum shaft is driven by the main shaft.

A spacing collar 25 is placed on the drum shaft between the outer cone and the sprocket wheel and to the inner side of the inner cone we locate a steel washer 26 adjacent which is a felt washer 27, the latter washers being housed within the bearing casing 17.

Immediately to the inner sides of the bearing casings 17 we locate similar drum supports 28, these being fastened by set screws 29 to the shaft 21, and being positively held against rotation on the latter shaft by keys 30. The members 28 carry the cylindrical metallic drum 31, which has the ends thereof terminating adjacent the inner face of the casings 17.

To the outer face of the drum we secure a plurality of similar tines or prongs 32, each tine being formed from a spring rod presenting a semi-circular body part 33 spanning the drum and an outturned, radially disposed, ground engaging portion 34, having the outer end thereof hooked and pointed as indicated at 35. The inner end of each prong is fastened by a screw bolt 36 to the drum and the successive prongs are equally spaced on the drum and are located in a spiralling formation as best shown in Figure 2, the distance between adjacent prongs being relatively small so that the ground worked by the prongs will be finely broken and the weeds effectively eradicated.

Each of the bolts 36 carries a spacing clamp 37 and the clamp engages the passing portions of the next adjacent prongs, thereby effectively fastening the body portions of the prongs as well as holding them in place against the drum.

The machine frame is adjustable in relation to the ground, such being brought about by the construction now described. A horizontally disposed guide track 38 is located above each casing 11, the forward end of the track being fastened in each instance by a bolt 39 to the front end of the gear casing at the top and the rear part of the track being supported by suitable brace bars 40 interposed between the track and the rear end of the casing 11. It will be observed that the tracks extend considerably to the rear of the brace bars.

To the housings 1 and 2 we fasten permanently a horizontally disposed U-shaped bar 41, and the side legs of the bar are provided with opposing bearings 42 and 43, which support rotatably the inner ends of similar aligned crank shafts 44 and 45, the outer ends of the crank shafts being carried in similar bearings 46 provided at the forward ends of the tracks. The cranks 47 and 48 of the crank shafts are both upturned and to the outer crank 48 in each instance we attach pivotally the forward end of a connecting rod 49, which has the rear end thereof forked to span the track and the forked end thereof carrying a flanged roller 50 riding the under side of the track in a location rearwardly of the brace bars 40. The inner cranks 47 are connected pivotally to the rear ends of similar, forwardly extending, operating rods 51 and 52, and these operating rods are each pivotally connected to similar forwardly disposed levers 53 and 54. The levers have their lower ends pivotally fastened at 55 to the rear ends of similar rear quadrants 56 and 57 located at the opposite sides of the housing 2, the quadrants being fastened together by bolts 58 located at the top and bottom sides of the housing.

The quadrants 56 and 57 are integrally formed with forward quadrants 59 and 60 and the forward quadrants carry side arms 61 located at opposite sides of the housing 2 which support pivotally the forked lower end of the main lever 62. The levers 53 and 54 are provided with the customary hand latches and detents, the latter operating over the quadrants 56 and 57, and the lever 62 is provided with a hand catch and detent, the latter operating over both the quadrants 59 and 60. It will be here observed that the supporting forks of the lever 62 extend below the pivot bolts 63 and that the lower extremities of the forks are pivotally connected to rearwardly extending arms 64 carried by a bracket 65 permanently fastened to the front end of the housing 2.

According to the above construction it will be apparent that when the lever 62 is shifted, the quadrants are all simultaneously shifted either forwardly or rearwardly in respect to the housing 2 depending on the direction of movement of the said lever. Further, it will be observed that the lever 53 or that 54 can be independently adjusted in respect to its quadrant.

To each head 10 we permanently fasten a bracket 66 and the rear ends of the radius rods 9 are fastened by bolts 67 to such brackets, and the latter brackets support rotatably the inner ends of relatively short rocker shafts 68, the outer ends of which are rotatably carried by supporting brackets 69 secured to the outer sides of the casings 11. The rocker shafts 68 are axially aligned transversely of the machine, and the outer ends of the rocker shafts carry rearwardly extending lever arms 70, the rear ends of which are inturned to provide stub shafts 71, on each of which a ground wheel 72 is rotatably mounted.

A lifting bar 73 is pivotally attached to the inner end of each stub shaft and extends upwardly and is pivotally connected to the forked end of the adjacent rod 49.

According to the above arrangement it will be observed that when either of the levers 53 or 54 are actuated, the lifting bar controlled thereby will be caused to swing and that such will result in the raising or lowering of the one side of the frame which is supported by the track on the roller. Any adjustment so given the frame will vary the position of that end of the drum in respect to the ground, so that the prongs thereof will work the ground shallower or deeper depending on the adjustment of the said lever 53 or 54. The lever 62 is in reality a master lever due to the fact that any adjustment given by manipulating it acts to simultaneously raise or lower both ends of the drum in respect to the ground, and at this time it will be understood of course that the levers 53 and 54 are held set by their detents and move with the quadrants which are all simultaneously shifted when the lever 62 is actuated.

A coil spring 74 connects each of the lifting bars to the adjacent track and these springs relieve the operator of considerable load when manipulating the levers.

We might here mention also that the machine can be provided with a guard plate (not shown) overlying the drum to prevent dirt from being thrown ahead and to avoid any accident through one becoming caught by the prongs.

From the above it will be observed that the machine can be readily drawn over the ground and driven by the tractor to which it is hitched and that the adjustment of the drum can be readily accomplished by the tractor attendant, due to the fact that the controlling levers are at the front end near the tractor. Further, it will be seen that the drum of the machine which is driven at a relatively high speed by the tractor power take-off shaft will effectively dig the roots from the ground and pitch them upwardly and rearwardly so that they will be exposed on the ground surface to be killed by exposure and sun.

What we claim as our invention is:—

1. In a weeding machine, a transversely extending main shaft, a forwardly extending and centrally disposed driving shaft, driving connections between the shafts and housings enclosing the latter and the shafts, rearwardly extending opposing gear casings permanently secured to the ends of the main shaft housing, a rotary pronged weeder carried by the rear ends of the gear casings, driving connections between the main shaft and the weeder, said connections being housed within the gear casings, ground wheels located at the outer sides of the gear casings and adjustable in respect thereto to vary the depth of cut of the prongs, an adjusting lever for each wheel adjacent the forward end of the drive shaft housing, said levers permitting of the independent adjustment of the wheels and a master lever adjoining the former levers and operating through the former levers to simultaneously adjust the wheels.

2. In a weeding machine, a transversely extending main shaft, a forwardly extending and centrally disposed driving shaft, driving connections between the shafts and housings enclosing the latter and the shafts, opposing similar gear casings permanently secured to the ends of the main shaft housing and extending rearwardly therefrom, a cross shaft rotatably carried by the rear ends of the gear casings, driving connections between the ends of the main shaft and the ends of the cross shaft, said connections being housed within the gear casings, a drum carried by and rotatable with the cross shaft and extending between the gear casings, earth digging prongs secured to the drum, ground wheels adjustably supporting the gear casings and located at the outer sides thereof and adjusting levers located at the forward end of the driving shaft gear housing and connected with the ground wheels and effecting the simultaneous or independent adjustment of the ground wheels in respect to the gear casings.

3. In a weeding machine, the combination with a main frame, of lever arms located at opposite sides of the frame and having their forward ends pivotally attached to the frame, stub shafts carried by the rear ends of the arms, ground wheels rotatably mounted on the stub shafts, rearwardly extending stationary tracks carried by the frame, a lifting bar pivotally secured to each stub shaft and extending upwardly and provided at the upper end with a member mounted for endwise movement on the under side of the track, adjusting levers carried by the frame and operating connections between the levers and the track engaging members.

4. In a weeding machine, the combination with a main frame, of lever arms located at opposite sides of the frame and having their forward ends pivotally attached to the frame, stub shafts carried by the rear ends of the arms, ground wheels rotatably mounted on the stub shafts, rearwardly extending stationary tracks carried by the frame, a lifting bar pivotally secured to each stub shaft and extending upwardly and provided at the upper end with a roller riding the under side of the tracks, an adjusting lever for each wheel carried by the frame and operating connections between each lever and one of the rollers.

5. In a weeding machine, a driven rotary weeding member comprising a centrally driven shaft, a cylindrical drum mounted on and rotatable with the shaft and a plurality of equi-spaced spirally arranged prongs secured to the drum, said prongs each presenting a body portion spanning approximately one half of the drum and a radially disposed portion extending from one end of the body portion, bolts fastening the other ends of the body portion to the drum and a spacing clamp carried by each bolt and engaging the passing body portions of the adjacent prongs.

WALTER O. NELSON.
SIVERT O. BRUNE.